United States Patent [19]
Turner

[11] Patent Number: 5,207,385
[45] Date of Patent: May 4, 1993

[54] FUEL INJECTION NOZZLE

[75] Inventor: Ronald F. Turner, London, United Kingdom

[73] Assignee: Lucas Industries Public Limited Company, Lolihull

[21] Appl. No.: 891,401

[22] Filed: May 29, 1992

Related U.S. Application Data

[63] Continuation of Ser. No. 599,302, Oct. 17, 1990, abandoned.

[30] Foreign Application Priority Data

Oct. 26, 1989 [GB] United Kingdom ............ 8924118.6

[51] Int. Cl.$^5$ ...................... F02M 47/06; F02M 55/00
[52] U.S. Cl. .............................. 239/533.3; 239/533.2; 239/584; 219/69.17
[58] Field of Search ............ 239/533.2, 533.3, 533.11, 239/533.12, 584, 533.9; 219/69.15, 69.17

[56] References Cited

U.S. PATENT DOCUMENTS

| | | | |
|---|---|---|---|
| 1,840,256 | 1/1932 | Rohwer | 239/584 |
| 3,511,442 | 5/1970 | De Luca | |
| 4,192,466 | 3/1980 | Tanasawa et al. | 239/533.3 X |
| 4,317,542 | 3/1982 | Morishita et al. | 239/533.2 X |
| 4,494,700 | 1/1985 | Dolenc | |
| 4,639,568 | 1/1987 | Check et al. | 239/533.3 X |
| 4,650,121 | 3/1987 | Augustin | 239/533.11 X |
| 4,721,838 | 1/1988 | Abdjkarimov et al. | 219/69.15 |
| 4,721,839 | 1/1988 | Dzewaltowski et al. | 239/533.3 X |
| 4,903,896 | 2/1990 | Letsche et al. | 239/533.9 X |
| 4,909,440 | 3/1990 | Mitsuyasu et al. | 239/533.9 X |

FOREIGN PATENT DOCUMENTS

| | | | |
|---|---|---|---|
| 0363142 | 4/1990 | European Pat. Off. | |
| 2358220 | 5/1975 | Fed. Rep. of Germany | |
| 2211601 | 7/1974 | France | |
| 107282 | 12/1923 | Switzerland | 239/584 |
| 981664 | 12/1982 | U.S.S.R. | 239/533.2 |
| 494951 | 11/1938 | United Kingdom | 239/533.3 |
| 1447040 | 8/1976 | United Kingdom | |
| 2173856A | 10/1986 | United Kingdom | |

Primary Examiner—Andres Kashnikow
Assistant Examiner—William Grant
Attorney, Agent, or Firm—Flynn, Thiel, Boutell & Tanis

[57] ABSTRACT

A fuel injection nozzle for internal combustion engines has a valve member slidable in a bore within a nozzle body. A first bore portion in which a first valve member portion is a close sliding fit extends from an end face of the body. The first bore portion is connected by an annular recess in the wall of the bore, forming an undercut bore portion, to a second tore portion which surrounds a reduced diameter portion of the valve member, the end of which seats in the closed condition of the nozzle on a valve seat formed in the nozzle body. This prevents the access of fuel from the undercut bore portion via the second bore portion to one or more spray nozzles formed in a tip portion of the nozzle body. A fuel supply passage extends from the end face of the body within the body wall and intersects an eccentric extension extending from the undercut bore portion for the supply of fuel thereto, the intersection including the portion of the eccentric extension closest to the end face.

10 Claims, 5 Drawing Sheets

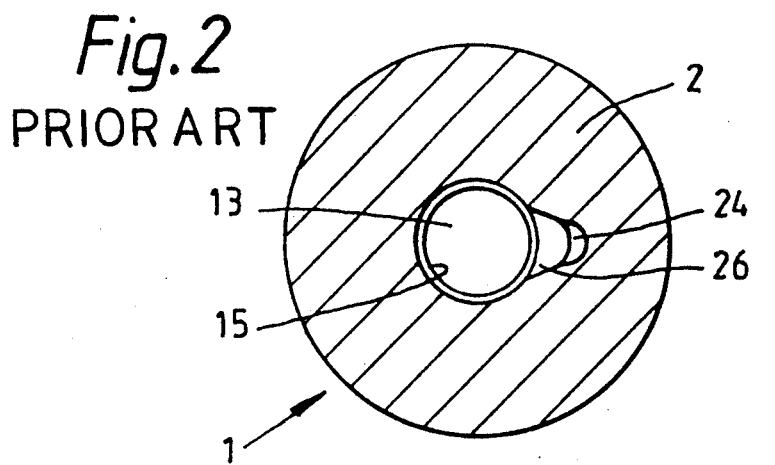
Fig. 2
PRIOR ART
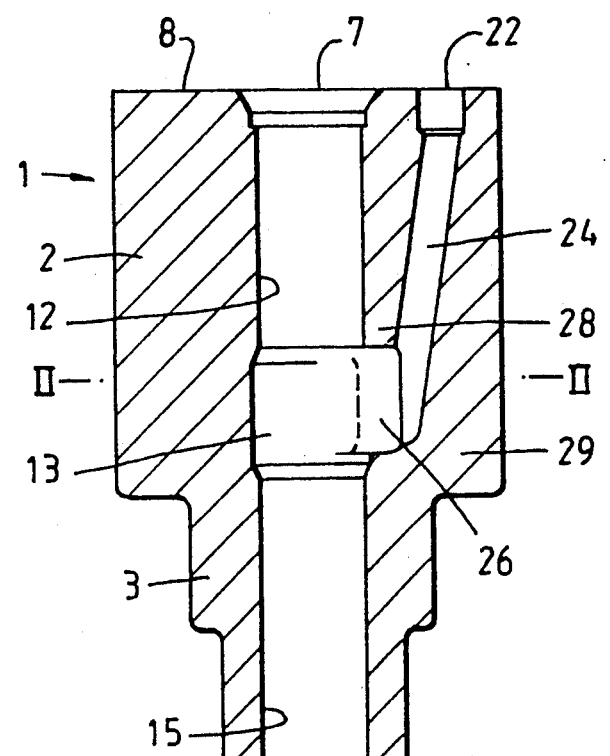
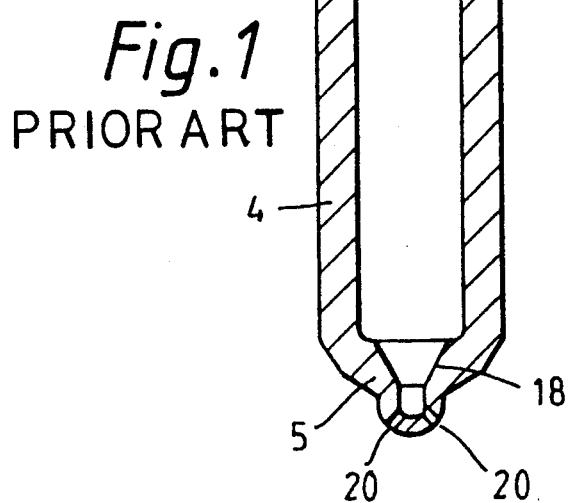
Fig. 1
PRIOR ART

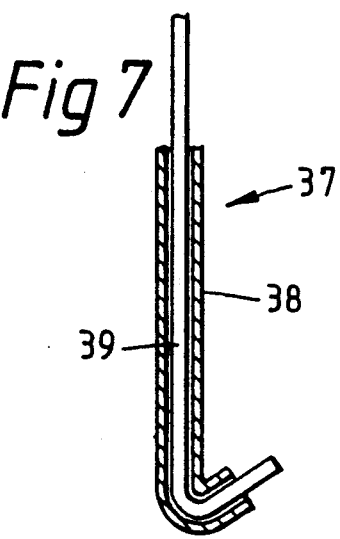
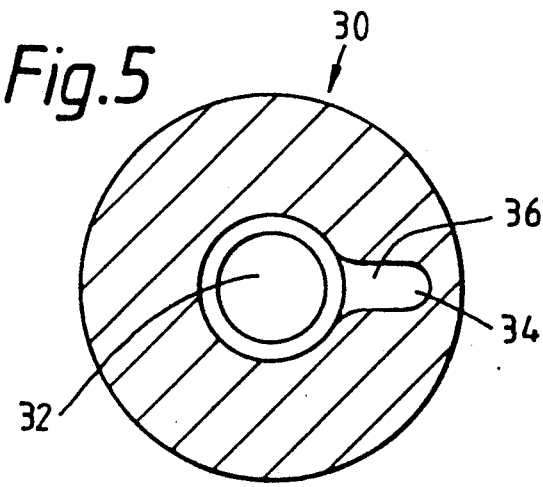
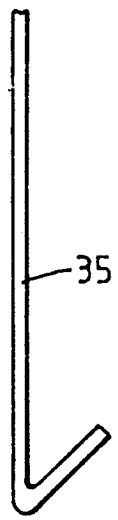
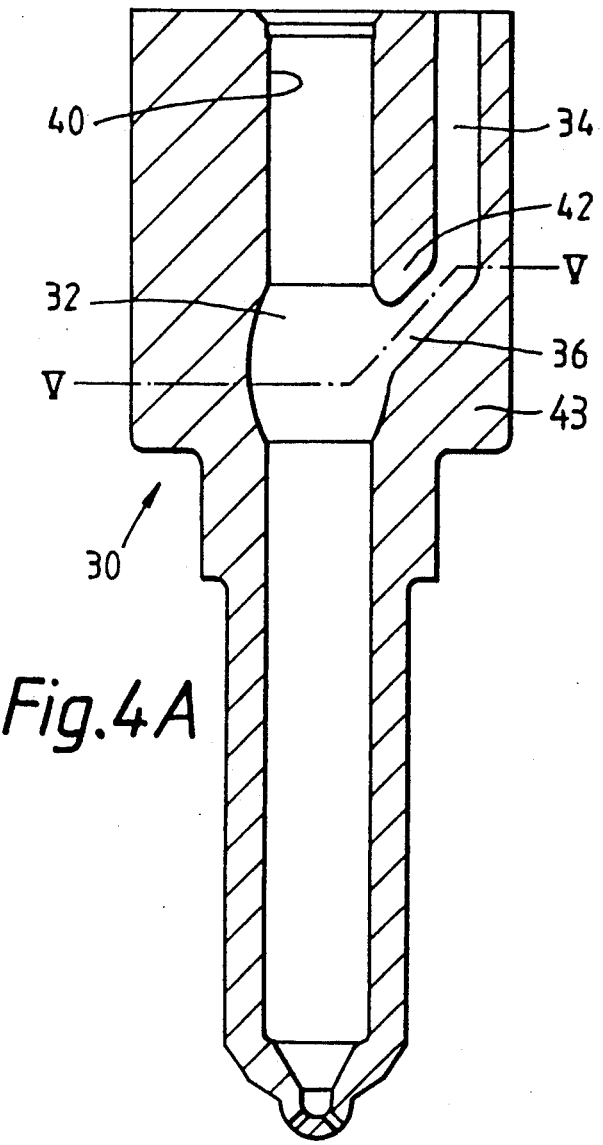

FUEL INJECTION NOZZLE

This application is a continuation of U.S. Ser. No. 07/599,302, filed Oct. 17, 1990, now abandoned.

DESCRIPTION OF THE PRIOR ART

This invention relates to fuel injection nozzles for internal combustion engines, the nozzles being of the kind comprising a nozzle body formed with a central bore extending from an end face and having a first portion in which a cylindrical portion of an injection valve member is a close sliding fit, the first portion of the bore being connected by an annular recess in the internal wall of the bore, forming an undercut bore portion, to a second bore portion surrounding a reduced-diameter portion of the valve member, the end of which seats in the closed condition of the nozzle on a valve seat formed in the nozzle body to prevent access of fuel from the second portion of the bore to one or more spray holes formed in a tip portion of the nozzle body, the nozzle body having a fuel passage in a wall surrounding the first portion of the bore extending from an inlet in the end face and for supplying fuel to the undercut bore portion.

Conventionally, the fuel passage is formed by a drilling from an offset point on the end face of the nozzle body, which extends at a small angle to the axis of the bore so as to break into the undercut portion of the bore. The undercut portion must therefore comprise a deep annular recess, or fuel gallery, in the internal wall of the bore. As a result of this method of construction it is not possible to maintain sufficient thickness of metal in the wall of the nozzle body (particularly of the web between the fuel passage and the undercut bore portion or fuel gallery) to ensure that the nozzle is strong enough for the highest operating fuel pressures while ensuring that the drilling communicates with the fuel gallery with sufficient fuel flow cross section.

It would in principle be possible to increase the strength of the nozzle body by increasing its overall physical dimensions. There is a need however to retain the same outer dimensions as prior injector nozzle bodies, both in order to retain a standard size of nozzle fitting, and to maintain advantageously compact dimensions.

UK Patent No. GB 2173856 illustrates a known fuel injection nozzle in which the requirement for a deeply undercut bore portion is avoided. In this nozzle a fuel collecting chamber is formed as an eccentric radial extension of the undercut tore portion. The fuel supply passage then extends from the end face at a small angle to the axis of the bore and opens into the radially outer surface of the fuel collecting chamber rather than into the undercut portion. The web of material between the fuel supply passage and the first bore portion and undercut bore portion is thus thickened and strengthened. However, since the radially outer surface of the fuel collecting chamber is parallel to the tore axis and the fuel supply passage opens into this outer surface at a small angle, a thin web of material is formed between the fuel supply passage and the collecting chamber. In operation of the nozzle this thin web of material is very likely to fracture and thus damage the nozzle.

SUMMARY OF THE INVENTION

The invention provides a method of making a fuel injection nozzle body for an internal combustion engine, comprising the steps of:
(a) providing a nozzle body having;
   a nozzle body tip formed with at least one spray hole; and
   a bore extending from an end face of said body to said nozzle body tip, said bore having first and second portions connected by an undercut portion, said first portion extending from said end face;
(b) forming a fuel passage extending from said end face; and
(c) forming an eccentric extension extending from said undercut bore portion;
   said fuel supply passage and said eccentric extension being orientated to intersect, the intersection including the portion of said eccentric extension closest to said end face.

This prevents the formation of thin residual webs, which would be liable to fracture, in the region of the intersection.

Either the drilled fuel passage or the extension of the undercut portion may be formed before the other. If, however, the eccentric extension of the undercut portion is to be formed by EDM or ECM, then it may be formed advantageously after the drilling of the fuel passage since EDM and ECM do not lead to the formation of burrs and can remove existing burrs. The opening of the fuel passage into the eccentric extension may not then require further deburring.

If, however, deburring or additional rounding of the intersection of the fuel passage and the eccentric extension are required then the conventional deburring method of forcing an abrasive paste through the injector fuel passage and bore may be used. This may be necessary in particular if the eccentric extension is formed by mechanical machining.

The central bore of a fuel injection nozzle formed according to the invention may first be machined conventionally, the undercut portion needing only to be recessed sufficiently deeply to permit subsequent honing or grinding of the first bore portion to form a close sliding fit with the valve member. The undercut portion may then be extended radially in the direction of the fuel supply passage by any of a variety of means including machining, grinding, electrochemical machining (ECM), or electrical discharge machining (EDM). The fuel passage itself may be formed by drilling.

In a preferred embodiment the valve member portion may additionally be supported within a part of the second bore portion, means being provided to allow the flow of fuel along the second bore portion. The fuel flow means may comprise a flute or flutes formed along the part of the valve member supported by the supporting part of the second bore portion.

In this embodiment, since the valve member is additionally supported within the second bore portion, the first bore portion in which the valve member is a close sliding fit may be shortened in length. In such a fuel injection nozzle the distance between the end face and the undercut portion may then be reduced, so that the angle between the fuel supply passage and the bore axis may be increased, thus increasing thickness of the web between the fuel passage and the wall of the undercut portion.

BRIEF DESCRIPTION OF THE DRAWINGS

Embodiments of the invention will now be described by way of example with reference to the accompanying drawings, in which:

FIG. 1 is an axial section of a prior art fuel injector nozzle comprising a radially extended undercut bore portion and an inclined fuel passage;

FIG. 2 is a radial section along II—II in FIG. 1;

FIG. 4A is an axial section of a fuel injector nozzle comprising an undercut portion extended by a radial, axially inclined extension.

FIG. 5 is a section along V—V in FIG. 4A;

FIG. 6 shows a shaped electrode for forming by EDM the extension to the undercut portion of the embodiment of FIGS. 4A and 5;

FIG. 7 is a longitudinal section of a shaped electrode for forming by ECM or EDM the eccentric extension to the undercut bore portion of the embodiment of FIGS. 4A and 5;

DETAILED DESCRIPTION OF EMBODIMENTS OF THE INVENTION

Figure 3:
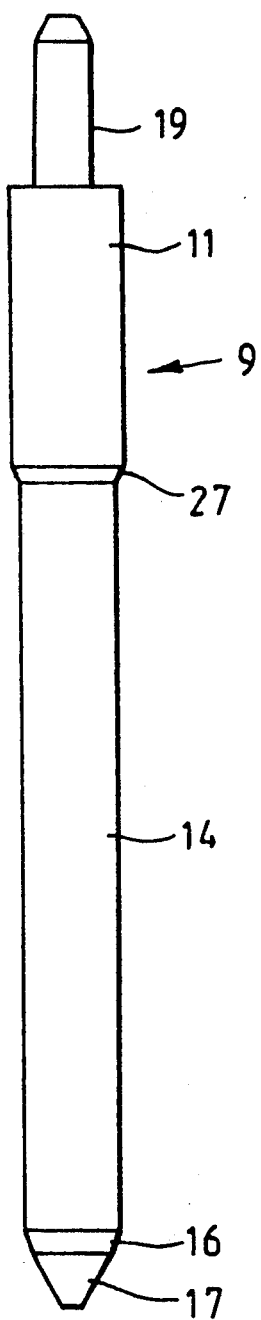
FIG. 3 shows a fuel injector valve member for the injector nozzles of FIGS. 1 and 2 or 4A and 5 or 4B.

The fuel injection nozzle shown in FIGS. 1 and 2 is for use in a compression-ignition engine and comprises a nozzle body 1 in the form of a body of revolution having a relatively large diameter upper end 2, an intermediate diameter portion 3 and a nozzle forming portion 4 of further reduced diameter, terminating in a nozzle tip 5.

An axial bore extends from an entry 7 in the free end surface 8 of the nozzle body portion 2 to the nozzle tip 5. To be mounted within the bore is a valve member 9, shown in FIG. 3, which has a cylindrical portion 11 which is a very close sliding fit in a first bore portion 12 leading from the entry 7 into an undercut bore portion 13 formed by an enlargement of the bore. The remainder 14 of the valve member 9 is of reduced diameter and extends through a second bore portion 15 within the body portions 3 and 4 to terminate in a valve tip formed by first and second frusto-conical surfaces 16 and 17, the junction of these two surfaces seating on a frusto-conical seating surface 18.

The valve member 9 is resiliently urged for example by a strong spring and thrust washer located on a pin 19 at the end of the valve member 9 into the closed condition in which it seats on the seating 18, thereby closing off access from the clearance space between the valve member portion 14 and the second bore portion 15, to the fuel spray holes 20.

Fuel is delivered to the fuel injector nozzle 1 at the entrance 22 to the fuel supply passage 24, which extends within the wall of the nozzle body 1 from the end face 8. The fuel passage 24 opens into an extension 26 to the undercut bore portion 13. When fuel is delivered to the nozzle under pressure by a fuel injection pump, the fuel pressure in the undercut portion 13 acts on an annular face 27 between the wider portion 11 and the narrower portion 14 of the valve member 9. A force is thus exerted on the valve member 9 which acts against that exerted by the strong spring located on the pin 19 at the end of the valve member 9. When sufficient fuel pressure is applied, the valve member 9 is raised from the frusto-conical valve seating surface 18, allowing fuel to flow under pressure to the spray holes 20.

The fuel supply passage 24 is a straight drilled passage, inclined slightly to the bore axis, and opens into a radial extension 26 of the undercut tore portion 13. The radial extension 26 may be formed by electrochemical machining (ECM) or electrical discharge machining (EDM) by using a shaped electrode inserted along the first bore portion 12. Alternatively the extension 26 may be formed by a cutting or grinding tool inserted along the first bore portion 12. The extension to the undercut portion is of the same axial length as the undercut portion 13. The opening between the fuel passage 24 and the undercut portion 13 is thus enlarged as far as possible to improve fuel flow. The end of the web 28 between the fuel passage 24 and the first bore portion 12 is also rounded and broadened, improving the fuel flow at the entrance to the undercut portion 13.

Further, the radial 26 of the undercut portion 13 allows the thickness of the web 28 to be increased. The reduced diameter of the undercut portion 13 compared with conventional injection nozzle fuel galleries also increases the thickness of the body wall 29 around the undercut portion 13. The nozzle body wall is thereby strengthened, allowing higher fuel delivery pressures to be used as required in modern engine designs.

A second embodiment of the invention is shown in FIGS. 4A and 5. These figures show a fuel injection nozzle body 30, the valve member for which and the operation of which are identical to those of the nozzle of the first embodiment. The construction of the undercut tore portion 32 and the fuel passage 34 are different however.

The undercut portion 32 is machined conventionally and the extension 36 is then formed by EDM, using a shaped electrode. A suitable electrode 35 is shown in FIG. 6. This electrode 35 can be inserted along the first bore portion 40 and the extension 36 formed by EDM using the pre-shaped electrode tip.

A further suitable electrode, either for ECM or EDM, is shown in FIG. 7. This electrode 37 comprises a rigid insulating tube 38 within which a deformable, electrically conducting electrode element 39 slidably extends. The rigid insulating tube 38 may be inserted along the first bore portion 12 and comprises a curved end, shaped so that the deformable conducting element may be fed along the tube during machining to emerge from the curved end of the tube 38 at a predetermined angle for machining the extension 36 to the undercut portion. During ECM or EDM some removal of material from the electrode tip occurs, so by feeding the electrode element 39 along the tube 38, the electrode material lost may be replaced during machining.

The fuel passage 34 is formed by drilling, and intersects the end of the extension 36 formed by EDM or ECM from within the undercut portion 32. The thickness of the web 42 between the fuel passage 34 and the first bore portion 40 and of the nozzle body wall 43 are thus advantageously increased, thereby strengthening the nozzle body 30 around the fuel passage 34.

Either the extension to the undercut portion 32 or the fuel passage 34 may be formed first. The fuel passage 34 and the extension 36 may be conceptualized as respective fuel supply passage portions of an overall fuel supply arrangement in the nozzle body.

Figure 4B:
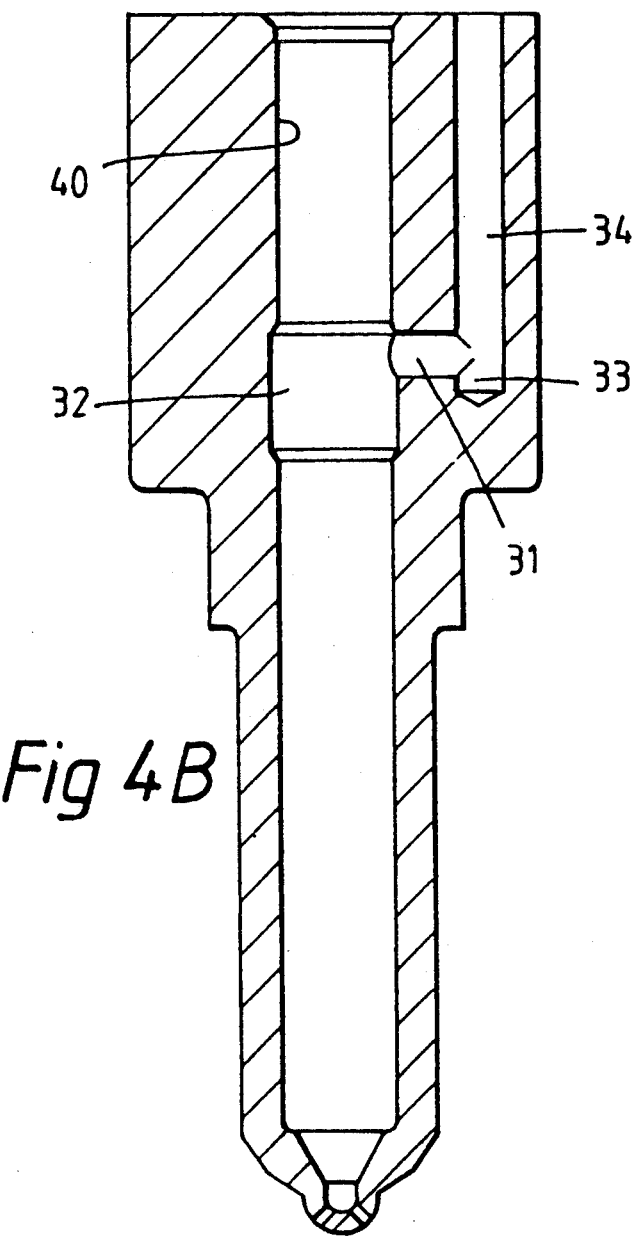
FIG. 4B is an axial section of a fuel injector nozzle comprising an undercut portion extended by a radial extension.
Figure 9:
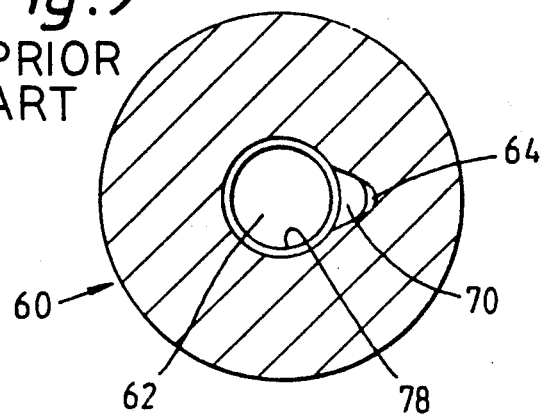
FIG. 9 is a radial section along IX—IX in FIG. 8.
Figure 11:
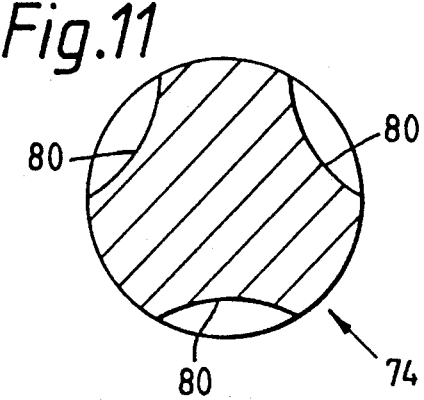
FIG. 11 is a section along XI—XI in FIG. 10, to an enlarged scale.
Figure 8:
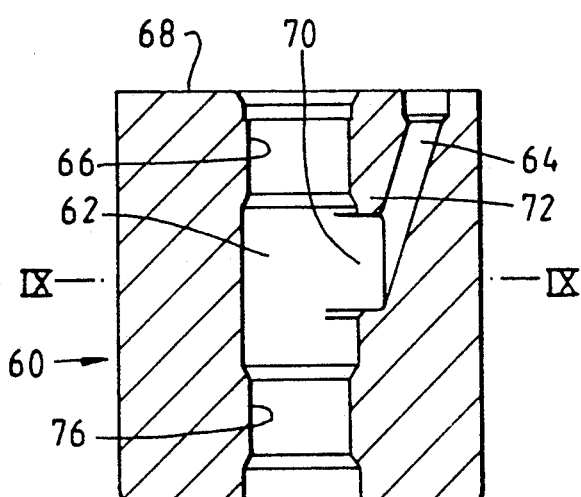
FIG. 8 is an axial section of a prior art fuel injector nozzle comprising two separate, short tore portions for slidably supporting a valve member and comprising a radially extended undercut portion.
Figure 10:
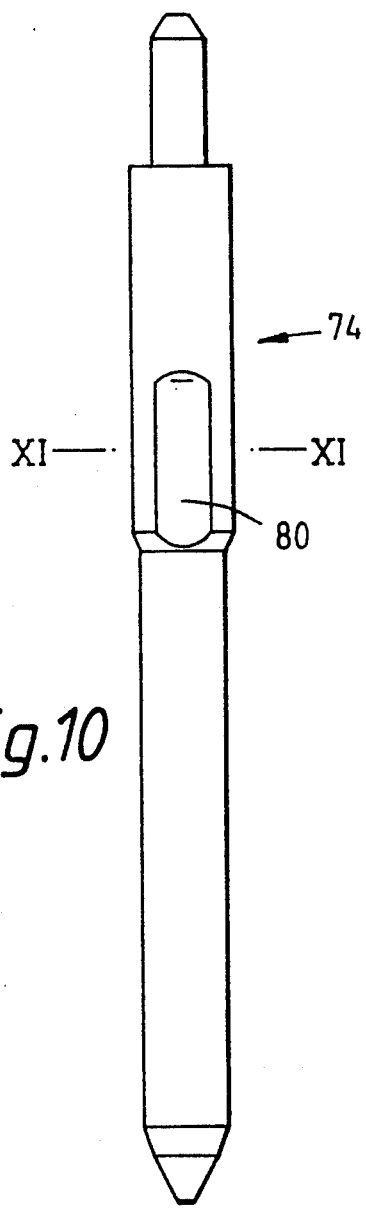
FIG. 10 is a lateral view of a valve member for use with the fuel injection nozzle of FIGS. 8 and 9, comprising a fluted portion.

The extension 36 of the undercut portion shown in FIGS. 4A and 5 extends both radially from the undercut portion 32 and is also inclined axially. This improves the flow of fuel from the fuel passage 34 to the undercut portion 32. However the extension 36 could in principle be formed at any axial inclination. For example FIG. 4B shows a nozzle body in which an extension 31 extends radially from the undercut portion 32. Similarly, although the fuel passage 34 is shown as parallel to the bore axis, it could be inclined to this axis to further improve fuel flow at the junction of the fuel passage 34 and the extension 31 but this would also reduce the thickness of the web 42.

It should also be noted that, as shown in FIG. 4B, the extension 31 does not necessarily have to intersect the end 33 of the fuel passage 34. This would however be detrimental to the fuel flow.

A fourth embodiment of the invention is shown in FIGS. 8 to 11. The principle of operation of this fuel injection nozzle 60 is the same as in the previous embodiments. An eccentric extension 70 is formed from the undercut bore portion 62 and intersects a straight, inclined fuel passage 64 as in the first embodiment, shown in FIGS. 1 and 2. In the fuel injection nozzle 60 of the third embodiment however, the length of the first bore portion 66 is decreased. This decreases the distance between the end face 68 and the undercut portion 62, shortening the fuel passage 64 and allowing it to be drilled at an advantageously increased angle to the bore axis. The angle at which the fuel passage 64 enters the extension 70 is thus increased, increasing the thickness of the web 72 and improving the fuel flow path.

A further bore portion 76, in which the valve member 74 is a sliding fit, is provided between the undercut bore portion 62 and the second bore portion 78 for supporting the valve member.

It is necessary however for fuel to flow from the gallery 62 past the further bore portion 76 to the second bore portion 78. This is achieved by forming three flutes 80 along the portion of the valve member 74 supported by the further bore portion 76. During operation, fuel flows along these flutes past the further bore portion 76.

I claim:

1. A method of making a fuel injection nozzle body for an internal combustion engine, comprising the steps of:
   (a) providing a one-piece monolithic nozzle body having a nozzle body tip formed with at least one spray hole, and a bore extending from an end face of said body to said nozzle body tip, said bore having first and second portions connected by an undercut portion, said first portion extending from said end face;
   (b) forming a first fuel passage portion extending from said end face; and
   (c) forming from within said bore a second, elongated fuel passage portion extending from said undercut bore portion;
   said first and second fuel passage portions being orientated to intersect, the intersection including the portion of said second fuel passage portion closest to said end face, wherein step (c) includes the steps of:
   providing an elongate electrode having a pair of straight portions connected by a curved portion so that said straight portions define therebetween an acute angle, one said straight portion being significantly longer than the other said straight portion, said other straight portion extending from said curved portion and terminating in an electrode tip adapted for machining said second fuel passage portion in said nozzle body; and
   inserting said electrode into said first bore portion and thereafter machining said second fuel passage portion using said electrode tip.

2. A method according to claim 1, wherein said electrode providing step includes providing a rigid elongate insulating tube having a pair of generally straight tube portions connected by a curved tube portion so that said straight tube portions define therebetween an acute angle, one of said straight tube portions being significantly longer than the other said straight tube portion, said other straight tube portion extending from said curved tube portion and terminating in an open free end, and positioning an elongate, deformable, electrically conductive element slidably within said rigid insulating tube so that said tube is sleeved on said conductive element and so that a free end of said conductive element projects outwardly from said open free end of said tube to define said electrode tip; and
   said machining step including the step of effecting removal of a portion of the electrode tip and feeding said deformable conductive element longitudinally through said insulating tube to replace the removed portion.

3. A fuel injection nozzle for an internal combustion engine, comprising:
   an elongated, generally tubular, one-piece monolithic nozzle body having a substantially flat end face at one end thereof and having means defining a spray hole at the other end thereof, a central bore extending through said nozzle body from said flat end face to said spray hole, said bore including a first bore portion adjacent said end face, a second bore portion adjacent the spray hole, and an undercut bore portion connecting said first and second bore portions, each of said bore portions being generally coaxial with and symmetrical about a longitudinal axis of said bore, said second bore portion being significantly longer than said first and undercut bore portions, said nozzle body including a large diameter portion, a small diameter portion, and an intermediate diameter portion connecting said large and small diameter portions, said first and undercut bore portions being provided in said large diameter portion, said second bore portion extending through said intermediate and small diameter portions, said first and second bore portions having approximately equal diameters, said undercut bore portion being larger in diameter than said first and second bore portions, said second bore portion having a tapered part adjacent said spray hole, said tapered part having a gradually increasing diameter as it extends away from said spray hole;
   said large diameter portion having a fuel supply passage provided therein and connecting said end face with said undercut bore portion, said fuel supply passage including a first passage portion which extends from said end face substantially parallel to the longitudinal axis of said central bore, said first passage portion extending alongside said first bore portion and being spaced radially outwardly therefrom, said fuel supply passage further including a second, elongated passage portion which extends between and intersects both said undercut bore portion and said first passage portion, the intersection of said first and second passage portions being closer to said end face than the intersection of said second passage portion and said undercut bore portion, said first passage portion and said first bore portion being approximately equal in length, said second passage portion being inclined relative to said first passage portion and extending from said undercut bore portion radially outwardly and axially towards said end face, said second passage portion having a diameter which is substantially smaller than the axial length of said undercut bore portion, said first passage portion having a diameter which is approximately equal to the diameter of said second passage portion;

said nozzle body further including a web disposed radially between said central bore and said fuel supply passage, said web extending axially from said end face and terminating in a free end adjacent the intersection of said second passage portion and said undercut bore portion, said web having a generally uniform radial thickness as it extends from said end face to the intersection of said first and second passage portions, said web having a progressively and continuously decreasing radial thickness as it extends from the intersection of said first and second passage portions to said free end; and an elongate and generally cylindrical valve member slidably disposed in said central bore of said nozzle body, said valve member including a large diameter portion which is snugly but slidably fitted in said first bore portion, a reduced diameter portion adjoining said large diameter portion and disposed in said second bore portion, said reduced diameter portion being longer than said large diameter portion, said large diameter portion and said reduced diameter portion having respective outer peripheral surfaces which are radially offset from each other, said valve member including an annular face defined radially between said radially offset outer peripheral surfaces of said adjoining large and reduced diameter portions, said reduced diameter portion extending from said annular face and terminating in a valve tip, said valve tip including a pair of adjoining frusto-conical surfaces, the junction of said adjoining frusto-conical surfaces being adapted to seat on a seating surface defined by a part of said nozzle body surrounding said tapered part of said second bore portion.

4. A method of mixing a fuel injection nozzle body for an internal combustion engine, comprising the steps of:

(a) providing a one-piece monolithic nozzle body having a nozzle body tip formed with at least one spray hole, and a bore extending from an end face of said body to said nozzle body tip, said bore having first and second portions connected by an undercut bore portion, each of said bore portions being generally coaxial with and symmetrical about a longitudinal axis of said bore, said first portion extending from said end face;

(b) forming a first fuel passage portion of circular cross-section extending from said end face substantially parallel to the longitudinal axis of said bore, said first passage portion extending alongside said first bore portion and being spaced radially outwardly therefrom; and (c) forming from within said bore a second fuel passage portion of circular cross-section extending from said undercut bore portion;

said first and second fuel passage portions being orientated to intersect to form a fuel supply passage, in which said second passage portion has a diameter which is substantially smaller than the axial length of said undercut bore portion, and the diameter of said first fuel passage portion is approximately equal to the diameter of said second passage portion.

5. A method according to claim 4, in which said second fuel passage portion is inclined relative to said first fuel passage portion and extends from said undercut bore portion radially outwardly and axially towards said end face.

6. A method according to claim 4, in which said second fuel passage portion is substantially perpendicular to said bore of longitudinal axis.

7. A method according to claim 4, in which said second fuel passage portion is substantially straight.

8. A method according to claim 4, in which, in step (c), said second fuel passage portion is formed by electrochemical machining (ECM).

9. A method according to claim 8, in which said first fuel passage portion is formed before said second fuel passage portion.

10. A method according to claim 4, in which, in step (c), said second fuel passage portion is formed by electrical discharge machining (EDM).

* * * * *